United States Patent [19]

Olofsson et al.

[11] Patent Number: 4,487,110
[45] Date of Patent: Dec. 11, 1984

[54] CLAMPING ELEMENT

[75] Inventors: Olof Olofsson, Deje, Sweden; Gunnar Larsson, Überlingen, Fed. Rep. of Germany

[73] Assignee: E.M.E. System Aktiebolag, Deje, Sweden

[21] Appl. No.: 448,847

[22] PCT Filed: Mar. 31, 1982

[86] PCT No.: PCT/SE82/00099
§ 371 Date: Dec. 6, 1982
§ 102(e) Date: Dec. 6, 1982

[87] PCT Pub. No.: WO82/03669
PCT Pub. Date: Oct. 28, 1982

[30] Foreign Application Priority Data

Apr. 13, 1981 [SE] Sweden ............................. 8102345

[51] Int. Cl.³ ...................... F01B 19/04; F01B 31/00; B23Q 3/08; F16C 11/10
[52] U.S. Cl. .......................................... 92/93; 92/105; 92/110; 92/130 B; 269/22; 269/49; 269/52; 269/254 R; 403/90
[58] Field of Search ................ 92/130 R, 130 B, 131, 92/84, 93, 105, 110; 279/4; 403/90, 123, 137, 138, 144, 146; 248/181, 562, 563, 566, 636, 663; 269/22, 47, 49, 52, 254 R

[56] References Cited

U.S. PATENT DOCUMENTS

| 1,334,503 | 3/1920 | Olson | 92/110 |
| 2,604,907 | 7/1952 | Berliner | 92/105 |
| 2,712,793 | 7/1955 | Holm | 92/84 |
| 3,068,893 | 12/1962 | Nicolaus | 92/105 |
| 3,971,217 | 7/1976 | Firth et al. | 92/105 |
| 4,273,461 | 6/1981 | Kjellstrand et al. | 403/90 |

FOREIGN PATENT DOCUMENTS 819422  4/1981  U.S.S.R. ............................. 92/130 B

Primary Examiner—Robert E. Garrett
Assistant Examiner—A. M. Bradley
Attorney, Agent, or Firm—Murray, Whisenhunt and Ferguson

[57] ABSTRACT

A clamping element comprises a single-acting cylinder and a piston with strong spring return which can be cancelled out by introduction of a pressure medium into the pressure chamber of the cylinder. The spring return is brought about, at least mainly, by means of a sleeve (6a, 6b) of rubber or rubber-like material which occupies a gap (5, 5b) between the piston (3, 3a, 3b) and the cylinder wall (7, 7a, 7b) or a lining (40) arranged in the cylinder. The rubber sleeve is firmly vulcanized, firmly glued or surface-fixed in some other manner against the cylindrical exterior of the piston and against the wall of the cylinder or the said lining along an axial length which considerably exceeds the thickness of the gap. (5, 5b)

20 Claims, 5 Drawing Figures

CLAMPING ELEMENT

TECHNICAL FIELD

The present invention relates to a clamping element of the type which comprises a single-acting cylinder and a piston with strong spring return, which can be cancelled by the introduction of a pressure medium into the pressure chamber of the cylinder.

BACKGROUND

Clamping elements are generally known where the clamping force can be cancelled out so as to release the clamping element with the aid of a single-acting hydraulic cylinder. The way in which such a clamping element can operate is shown for example in U.S. Pat. No. 4,273,461. This patent specification also shows a typical sphere of application for a clamping element of the type which is the object of the present invention, namely to press two objects together with the possibility, when required, of being able to release the coupling between the two objects. In the said U.S. Pat. No. 4,273,461 the two objects comprise parts of a ball and socket joint. The areas of application for clamping elements of the type concerned can however be quite numerous and are in no way restricted to this application.

A typical feature of a clamping element as shown in the said U.S. Pat. No. 4,273,461 is that it is relatively large and complicated and hence both expensive to manufacture and in many cases difficult to apply.

A major contributory factor to the high production costs for conventional clamping elements of the type which includes single-acting hydraulic or pneumatic cylinders is that the cylinders have to be manufactured with high accuracy so that the requisite seal can be achieved between the cylinder wall and the piston in the cylinder. Normally sliding seals are certainly arranged between the moving parts, but these can not eliminate the need for extreme precision during the manufacture of the inside of the cylinder. One example of a clamping element of the type specified in the introduction is illustrated in German patent application No. 2,065,506, where an O-ring has been arranged in a known manner between a hydraulic piston and the inside of the cylinder. A similar arrangement is illustrated in U.S. Pat. No. 2,552,304. One way of reducing the manufacturing cost of the cylinders is, instead of sliding seals, to employ membrane seals, which are known in connection with membrane boxes especially for pneumatic coupling elements. An example of such an element is shown in German patent publication No. 2,129,750. However a limitation in such a design is that it can be employed mainly only for comparatively low clamping forces. Furthermore the clamping force must be brought about completely by separate organs, which naturally require space and render construction more expensive, so that they can become both unacceptably expensive and difficult to employ.

The object of the present invention is to provide a clamping element without the disadvantages and limitations which characterise earlier designs. More particularly, one aim is to provide a clamping element which consists of only a few components, none of which require especially high manufacturing precision.

It is also an aim to provide a clamping element which, in spite of relatively small external dimensions, can generate a high clamping force and which, because of this, can be employed in a number of different applications, for example for clamping two objects which are to be combined, for restraining work pieces, for setting elements in fixed positions etc.

These and other objectives can be achieved by virtue of the fact that at least to a considerable extent the spring return in the clamping element is brought about by means of a sleeve of rubber or rubber-like material which fills a gap between the piston and cylinder wall or between the piston and a lining arranged in the cylinder, whereby the rubber sleeve is firmly vulcanised, firmly glued or surface-fixed in some other manner both against the cylindrical exterior of the piston and against the cylinder wall or said lining along an axial length which considerably exceeds the thickness of the gap. The rubber sleeve can be responsible completely for the spring return, but it is also possible to supplement the rubber sleeve by one or more metal springs so as to provide the powerful spring action which is required for strong clamping.

In the case where the rubber sleeve is responsible completely for the spring return it is preferable that the rubber sleeve be firmly vulcanised or surface-fixed in some other manner against the piston and against the cylinder wall or against the said lining along an axial length which amounts to at least five times the width of the gap. If one or more metal springs are also provided to supplement the action of the rubber sleeve as return spring, the length of the rubber sleeve can be correspondingly reduced, e.g. to twice the width of the gap.

To further simplify and cheapen the manufacture of the clamping element in accordance with the invention the rubber sleeve can be vulcanised firmly in a metal sleeve, which is subsequently shrunk and fixed in the cylinder by gluing between the cylinder wall and the side of the metal sleeve.

In accordance with a preferred aspect of the invention, the piston rod is designed as a clamping screw. The pressure medium can be introduced into the pressure chamber through a channel in the piston rod/clamping screw. Naturally however it is also possible to introduce the pressure medium using a known method through an inlet aperture at the opposite end of the pressure chamber.

Further characteristics and aspects of the invention, also its advantages, will be illustrated by the patent claims which follow and by the following description of some preferred embodiments.

BRIEF DESCRIPTION OF DRAWINGS

In the following description of preferred embodiments reference will be made to the attached diagrams where.

DESCRIPTION OF PREFERRED EMBODIMENTS

Figure 1:
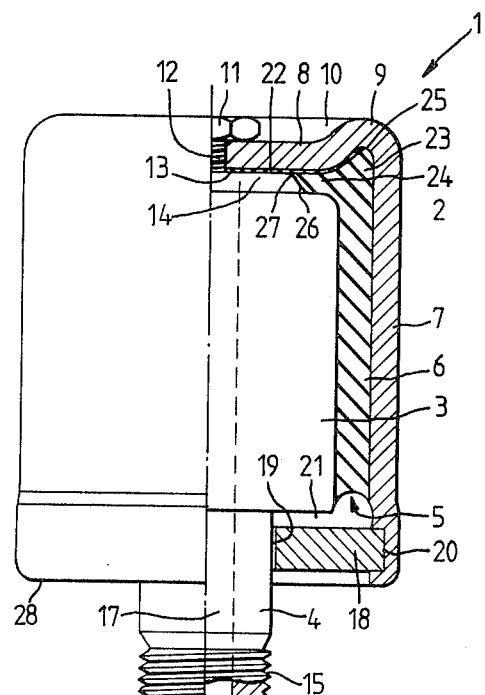
FIG. 1 illustrates a clamping element in the form of a clamping screw, partly in side view and partly in the form of an axial section, in accordance with an initial preferred embodiment of the invention.

Referring first to FIG. 1, a clamping element is generally designated by the number 1. The clamping element 1 has the following main parts, namely a cap 2 which forms an hydraulic cylinder, a piston 3 with a piston rod 4 designed as a clamping screw, together with a sleeve 6 of rubber or rubber-like material which is arranged in the gap 5 between the inside of the cylinder 2 and the piston 3.

The cap or cylinder 2 is made from a deep-drawn plate, and actually it represents one of the most significant advantages of the invention that this part of the element can be produced in such a simple manner as by mere deep-drawing of a piece of plate. The cap 2 consists of a cylindrical portion 7 which comprises the actual cylinder in the unit and an upper end flange 8. The transition between the cylinder 7 and the flange 8 is gently rounded. The transition section is designated as 9. In the area around the end flange the cap 2 thus exhibits a recessed section 10, in the central portion of which a plug 11 is arranged, which in the cases illustrated seals off an alternative connection 12 to a pressure chamber 13. In accordance with the embodiment the cylindrical portion 7 of the cap 2 has absolutely circular form but if required can be made wholly or partially hexagonal or in some other shape which permits spanner engagement.

The piston 3 consists of a cylindrical body the top of which has a central portion having the approximate shape of a low truncated cone 14. The shape of the component 14 can also be compared with the shape of the deep inverted soup plate. At its far end the piston rod 4 is threaded, partly externally 15 and partly internally 16. The outer thread 15 functions as a screw in combination with a clamping nut, whilst the inner thread is designed for a connection for the supply of hydraulic oil to the pressure chamber 13. To this end an axial channel 17 is provided which extends throughout the entire piston rod 4. The piston rod 4 also extends through a bottom washer 18 with a central aperture 19. The bottom washer 18 is permanently recessed in a groove 20 in the lower portion of the cap 2. The distance between the piston 3 and bottom washer 18 is designated 21. The gap 21 here determines the maximum stroke length of the piston 3.

The rubber sleeve 6 occupies essentially the entire length of the gap 5 from the lower edge of the piston 3 and, with a portion 23, also occupies the "bend" inside the rounded transition 9, whilst a portion 24 occupies the space between the end flange 8 of the cap and the upper surface of piston 3 outside the cone 14. The rubber sleeve 6 is firmly vulcanised both against the inside of the cylindrical portion 7 of the cap 2 right up to point 25 inside the rounded transition 9, also to the piston 3 along its cylindrical portion, and to the top side of piston 3 which faces the rubber, together with the side 26 of the bevel shaped section 14 to point 27.

On the other hand the rubber is not firmly vulcanised to the end flange 8 of cap 2. To prevent vulcanising taking place in this area, instead a disc 22 is provided which extends from the channel 12 out to point 25 and which thus prevents vulcanising at the top. Thus when the rubber sleeve 6 has been firmly vulcanised against the surfaces as described above, the cap is pressed together so that the shrinkage of the rubber because of vulcanising is compensated for in a known manner. At the same time the lower portion of the cap is pressed in so that the bottom washer 18 engages in the circumferential groove 20.

Figure 4:
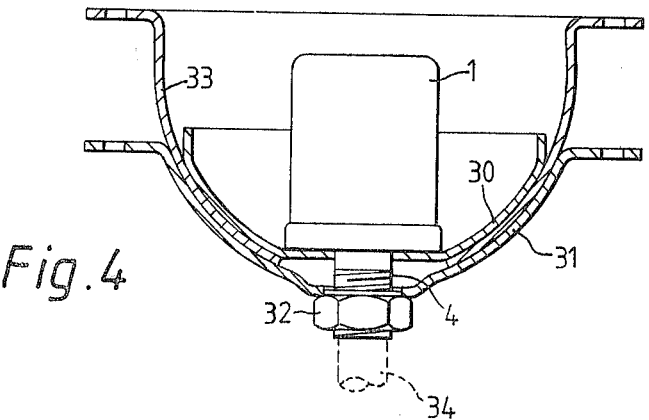
FIG. 4 illustrates a method of employing the clamping element in accordance with the invention.

FIG. 4 illustrates one method of employing the element 1. The clamping element 1 is here arranged with its lower edge 28 against an inner cup 30 forming part of a ball and socket joint of the type which is the subject of the said U.S. Pat. No. 4,273,461. The clamping screw/piston rod 4 extends through a central hole in the inner cup 30 and through a corresponding central hole in an outer cup or female clamping member 31, on the outside of which a clamping nut 32 is arranged. When the nut 32 is tightened up a centre cup 33 is clamped firmly between the two said cups 30 and 31 so that the ball and socket joint is fixed in a certain position. When the nut 32 is thus tightened, the piston rod 4 and thus the piston 3 is drawn downwards a short distance so that the gap 21 reduces somewhat in size. At the same time stretching of the rubber sleeve 6 in gap 5 occurs. However there is no sliding between the rubber material 6 and the inside of the cap 2 in the vicinity of the cylindrical portion 7 or between the rubber sleeve 6 and the piston 3, because the rubber is firmly vulcanised against both these components. However, a gap is opened between the top of the piston 14 and the top of the cap 8 so that the pressure chamber 13 is extended right up to point 25. As a result of the stretching due to shearing forces in the material of the rubber sleeve 6 a clamping force is obtained, the magnitude of which can be regulated by means of the nut 32. When the connection is to be released so as to alter the position of the centre cup 33 in relation to the surrounding cups 30 and 31, a pressure medium is supplied, preferably hydraulic oil, to the pressure chamber 13 via a connecting pipe 34 and the channel 17 which extends through the piston rod 4. The hydraulic oil in the pressure chamber 13 then exerts a pressure on the piston 3 so that this is pressed further downwards. In the majority of cases where the element is to be employed a displacement of the order of 1 mm is sufficient to break the connection so that the elements can be released from each other and adopt new positions. The maximum depth of depression is here governed by the width of the gap 21, which at its maximum corresponds to the depression of the piston 3 by the pre-loading, and by the stroke length of the piston 3 during disengagement. When the components 30, 31 and 33 are to be fixed in a new position, the hydraulic oil is allowed to return through the channel 17 and pipe 34, whereby the spring force of the rubber material causes the piston 3 to revert to the initial position.

Figure 5:
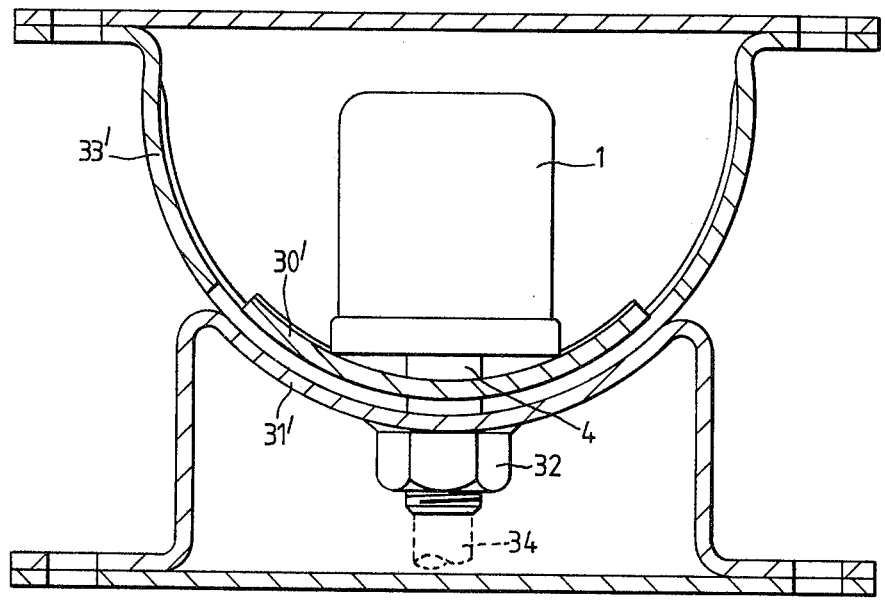
FIG. 5 illustrates how a clamping element in accordance with the invention can be employed in an arrangement similar to that shown in FIG. 4.

FIG. 5 illustrates a similar arrangement. The more essential difference is that in this case use is not made of spherical cups, but instead of components formed from steel strip to make parts of cylinders. In this case the different elements can only move in relation to each other in one plane and in this case the connection is a toggle joint. The function is otherwise the same as with the arrangement shown in FIG. 4. The same notation has been employed for identical components as in FIG. 4 and for analogous components the same notation has been used with the addition of a'-sign.

Figure 2:
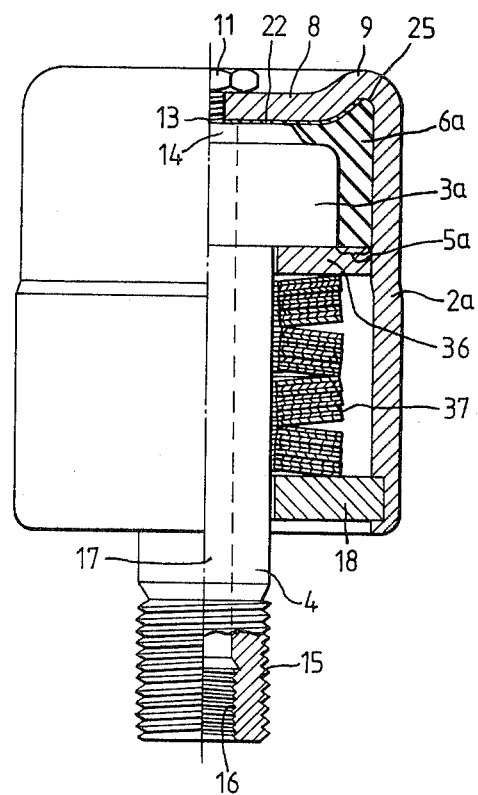
FIG. 2 shows in a corresponding manner a clamping element in the form of a clamping screw, representing a second preferred embodiment of the invention.

In the embodiment shown in FIG. 2 the piston 3a has been made considerably shorter than in the preceding embodiment. In this case the rubber sleeve 6a occupies the gap between the piston 3a and the dome 2a and is welded firmly against both of these components from an intermediate washer 36 up towards the top of the cap 2a or the end flange 8 in across the top section of the piston 3a towards the centre cone 14 in the same way as in the preceding embodiment.

The shorter length of the rubber sleeve 6a and thus the reduced clamping force which can be obtained with the aid of the rubber sleeve is compensated in accordance with the embodiment by a stack of spring washers 37 arranged between the intermediate washer 36 and the bottom washer 18. Otherwise the clamping element is designed in the same way as in the preceding embodiment and is also employed in an identical manner. Hence for these components and for the components which have not been mentioned in connection with FIG. 2, reference should be made to the description of the element in accordance with FIG. 1.

Figure 3:
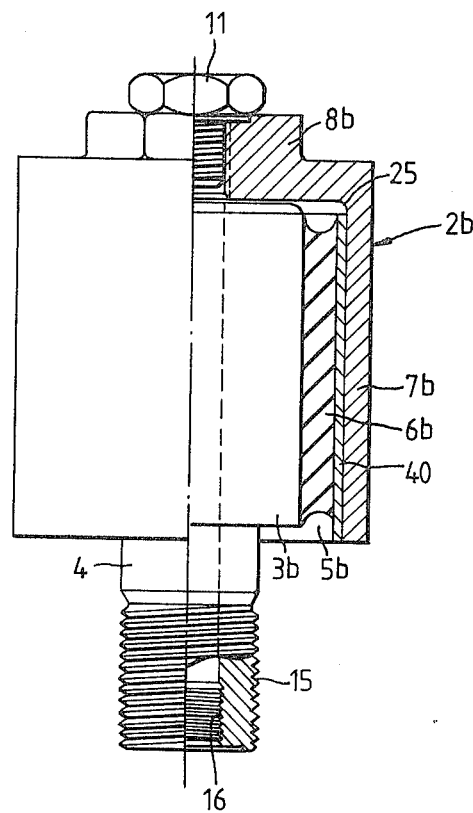
FIG. 3 illustrates a further preferred embodiment of the invention.

The embodiment shown in FIG. 3 differs from the preceding embodiments mainly in that in this case the cap 2b has not been manufactured by deep drawing of a plate, but by cutting machining of a blank. As result the cap 2b cannot be shrunk in the same way as can be done with a plate cap. Therefore, instead, the rubber sleeve 6b has been firmly vulcanised in advance against a metal sleeve 40 which after vulcanising is pressed together so as to compensate for the shrinkage of the rubber as a result of vulcanising. Subsequently the piston 3b together with the vulcanised rubber sleeve 6b and metal sleeve 40 have been introduced into the cap 2b where, in the position shown in FIG. 3, they are glued firmly to the cylindrical portion 7b of the cap 2b by bonding between the said portion and the metal sleeve 40. Because vulcanising of the rubber sleeve 6b in this case is carried out before the piston with rubber sleeve and metal sleeve is introduced into the cap 2b, it is not necessary to have a disc corresponding to the disc 22 as with the preceding embodiments. The pressure chamber 13b thus extends in this case from the central space underneath the plug 11 in the form of a thin gap past the piston 3b right up to the transition 25b between the top 8b and the cylindrical portion 7b. Otherwise the clamping element in accordance with FIG. 3, as in the preceding embodiments, is provided with a piston rod 4 designed as a clamping screw with external and internal threads 15 and 16 respectively. The function of the element is also the same as in the preceding embodiments.

We claim:

1. Clamping element comprising a single-acting cylinder and a piston having a piston rod wherein a sleeve (6,6a, (6b,40)) at least a portion of which is rubber or rubber-like material occupies a gap (5,5b) between the piston (3,3a,3b) and the cylinder wall (7,7a,7b), said sleeve being firmly bonded against the cylindrical exterior of the piston and against the cylinder wall along an axial length which considerably exceeds the thickness of the gap (5,5b), whereby said sleeve exerts a strong spring force upon said piston, when said piston is displaced within said cylinder; said cylinder, said piston and said sleeve defining an enclosed pressure chamber of the cylinder; means for introducing a pressure medium into the pressure chamber of the cylinder, whereby the strong spring spring force exerted by said sleeve on said piston can be cancelled out by introduction of a pressure medium into the pressure chamber of the cylinder; a female clamping member; external engaging means for detachably engaging said female clamping member, said external engaging means being disposed on said piston rod, whereby a clamping force is exerted between said cylinder and said female clamping member by said sleeve upon displacement of said piston within said cylinder, when said female clamping member is engaged by said external engaging means.

2. Clamping element as claimed in claim 1, wherein the rubber sleeve (6, 6b) is wholly responsible for said clamping force.

3. Clamping element as claimed in claim 1, wherein one or more metal springs (37) supplement the rubber sleeve (6a) to provide said strong spring force upon said piston.

4. Clamping element as claimed in claim 2, wherein the rubber sleeve (6, 6b) is firmly bonded along an axial length which is at least five times the width of the gap (5, 5b).

5. Clamping element as claimed in claim 3, wherein the rubber sleeve (6a) is firmly bonded along an axial length which is at least twice the width of the gap (5a).

6. Clamping element as claimed in claim 1, wherein said sleeve comprises an interior rubber sleeve (6b) firmly bonded to an external metal sleeve (40), said rubber sleeve bonded against the cylindrical exterior of the piston and said metal sleeve bonded against the cylinder wall.

7. Clamping element as claimed in claim 1, wherein said external engaging means comprise a screw thread.

8. Clamping element as claimed in claim 7, wherein a channel is formed through said piston and piston rod for introduction of a pressure medium into the pressure chamber (13, 13b).

9. Clamping element as claimed in claim 1, wherein the cylinder comprises a part of a cap, the top (8, 8b) of which forms the portion of the pressure chamber facing the piston.

10. Clamping element as claimed in claim 9, wherein said cap is formed by deep-pressing of a plate blank.

11. A clamping element comprising:
a cylinder member of predetermined internal cross-sectional dimension having an axis and two ends, said cylinder member comprising at least one enclosing wall substantially parallel to said cylinder member axis and an end cap, integral with said at least one enclosing wall, substantially transverse to said cylinder member axis, closing one end of said cylinder member in a fluid-tight seal, whereby said cylinder member has one closed end and one open end;
a piston body having an axis and of predetermined outside cross-sectional dimension less than the internal cross-sectional dimension of said cylinder member, said piston body substantially coaxially receivable within said cylinder member with a gap between said piston body and said at least one enclosing wall;
a resilient member disposed within said gap and connecting said piston body to said at least one enclosing wall in a fluid-tight seal, said resilient member spring-elastically resisting axial movement of said piston body with said cylinder member;
a piston rod having an axis connected to said piston body and extending coaxially outwardly through the open end of said cylinder member;
a female clamping member; external engaging means for detachably engaging said female clamping member, said external engaging means disposed on the outward end of said piston rod;
means for introducing a pressurized fluid into said cylinder member between said piston body and said end cap, whereby upon axial displacement of said piston body toward said open end of said cylinder member, said resilient member exerts a spring-elastic resisting force thereon, which can be cancelled out by introduction of a pressurized fluid into said cylinder member between said piston body and said end cap, said spring-elastic resisting force acting to clamp an element to be clamped between said female clamping member and said at least one enclosing wall at the open end of said cylinder member, when said female clamping member is engaged by said external engaging means.

12. The clamping element as claimed in claim 11, wherein said means for introducing a pressurized fluid into said cylinder member comprises a hollow bore extending through said piston rod and said piston body, said hollow bore at the outward end of said piston rod being internally threaded.

13. The clamping element as claimed in claim 11, wherein said means for detachably engaging a female clamping member comprises external threading corresponding to internal threading on said female clamping member.

14. The clamping element as claimed in claim 11, further comprising spring means for spring-elastically resisting axial movement of said piston body toward said open end of said cylinder member.

15. The clamping element as claimed in claim 11, wherein said resilient member is connected to said piston body and said at least one enclosing wall along an axial length which is at least two times the width of said gap.

16. The clamping element as claimed in claim 11, wherein said resilient member comprises a sleeve of rubber-like material bonded to said piston body and to said at least one enclosing wall.

17. The clamping element as claimed in claim 11, wherein said resilient member comprises a first sleeve of rubber-like material and a second sleeve of metal, said first sleeve bonded to said piston body and said second sleeve, said second sleeve bonded to said at least one enclosing wall.

18. The clamping element as claimed in claim 11, wherein said cylinder member is formed by deep-pressing of a plate blank.

19. The clamping element as claimed in claim 11, wherein said cylinder member, adjacent its open end, has an internal circumferential groove substantially transverse to said cylinder member axis in said at least one enclosing wall; an annular disc permanently recessed in said groove, the annular opening of said disc receiving said piston rod whereby said piston rod is axially movable therethrough.

20. The clamping element as claimed in claim 19, wherein at least one spring is coaxially disposed about said piston rod between said annular disc and said piston body, whereby said at least one spring spring-elastically resists axial movement of said piston body toward said annular disc.

* * * * *